(12) United States Patent
Schönherr

(10) Patent No.: US 6,944,693 B2
(45) Date of Patent: Sep. 13, 2005

(54) METHOD FOR CENTRALLY SETTING DATA RATE IN A DATA TRANSMISSION FACILITY AND A DEVICE FOR CENTRALLY SETTING DATA RATES

(75) Inventor: Dietmar Schönherr, Lemgo (DE)

(73) Assignee: Phoenix Contact GmbH & Co., KG, Blomberg (DE)

( * ) Notice: Subject to any disclaimer, the term of this patent is extended or adjusted under 35 U.S.C. 154(b) by 413 days.

(21) Appl. No.: 10/113,440

(22) Filed: Mar. 28, 2002

(65) Prior Publication Data

US 2002/0194360 A1 Dec. 19, 2002

(30) Foreign Application Priority Data

May 5, 2001 (DE) .......................................... 101 21 912

(51) Int. Cl.⁷ .......................... G06F 13/42; G06F 3/00; H04Q 1/20
(52) U.S. Cl. .......................... 710/106; 710/11; 710/19; 375/225
(58) Field of Search ................................. 710/305, 104, 710/110, 8, 15; 700/83; 709/225; 713/600; 340/310.02; 375/377, 370, 357, 350, 225, 224, 222

(56) References Cited

U.S. PATENT DOCUMENTS

| | | | | |
|---|---|---|---|---|
| 4,761,800 A | * | 8/1988 | Lese et al. ................... 375/370 |
| 5,051,720 A | * | 9/1991 | Kittirutsunetorn ..... 340/310.02 |
| 5,490,209 A | * | 2/1996 | Kennedy et al. .......... 379/93.08 |
| 5,526,490 A | * | 6/1996 | Nishikawa ................... 709/225 |
| 5,619,532 A | * | 4/1997 | Tani et al. ................... 375/224 |
| 5,671,250 A | * | 9/1997 | Bremer et al. ............... 375/222 |
| 6,069,926 A | * | 5/2000 | Sekiya et al. ................ 375/357 |
| 6,072,827 A | * | 6/2000 | Krulce ........................ 375/225 |
| 6,076,952 A | * | 6/2000 | Gretta et al. ................... 700/83 |
| 6,163,586 A | * | 12/2000 | Hongbin Hao et al. ...... 375/377 |
| 6,198,785 B1 | * | 3/2001 | Flynn .......................... 375/377 |
| 6,286,071 B1 | * | 9/2001 | Iijima ......................... 710/124 |
| 6,366,610 B1 | * | 4/2002 | Loyer et al. ................. 375/225 |
| 6,434,633 B1 | * | 8/2002 | Braun et al. .................. 710/15 |
| 6,463,490 B1 | * | 10/2002 | Wang et al. ................. 710/110 |
| 6,470,059 B2 | * | 10/2002 | Starr .......................... 375/350 |
| 6,609,167 B1 | * | 8/2003 | Bastiani et al. ............. 710/104 |
| 6,665,810 B1 | * | 12/2003 | Sakai .......................... 713/600 |
| 6,680,970 B1 | * | 1/2004 | Mejia .......................... 375/225 |
| 6,724,815 B1 | * | 4/2004 | Jepsen et al. ................ 375/225 |
| 6,775,714 B1 | * | 8/2004 | Miyano ......................... 710/8 |
| 6,792,041 B1 | * | 9/2004 | Kim et al. .................... 375/225 |
| 6,795,871 B2 | * | 9/2004 | Nolan et al. ................... 710/8 |
| 6,810,078 B2 | * | 10/2004 | Bradley ....................... 375/225 |

FOREIGN PATENT DOCUMENTS

| | | |
|---|---|---|
| DE | 4418622 C2 | 11/1995 |
| DE | 29908608 U1 | 8/2000 |

OTHER PUBLICATIONS

Interbus Basics and Practice ISBN 3–7787–2471.

* cited by examiner

Primary Examiner—Glenn A. Auve
Assistant Examiner—Christopher E. Lee
(74) Attorney, Agent, or Firm—Charles E. Baxley

(57) ABSTRACT

In the method according to the present invention for centrally setting data rate in a data transmission facility, the data rate is detected and set at subscribers on the basis of data rate setting telegrams sent by a central station. In addition to an interface to a peripheral application, the subscribers include a protocol core and devices according to the present invention for data rate detection and setting. Data rate detection is solved with a telegram detection system, wherein one data rate detector is provided for each data rate and the transmitted telegrams in the timed data rate setting phase have the same content for each of the data rates concerned.

28 Claims, 4 Drawing Sheets

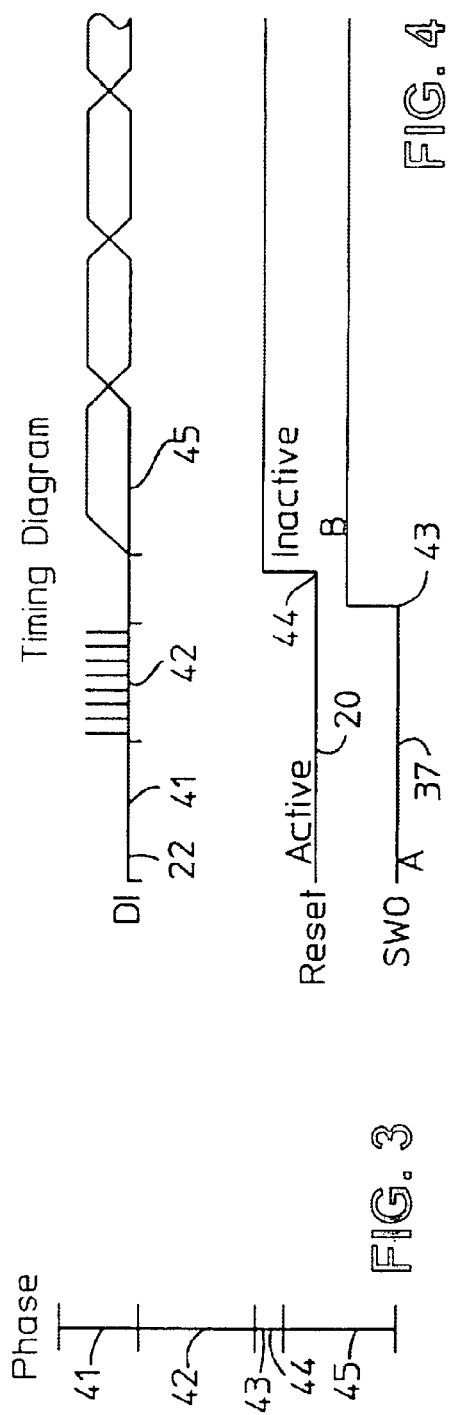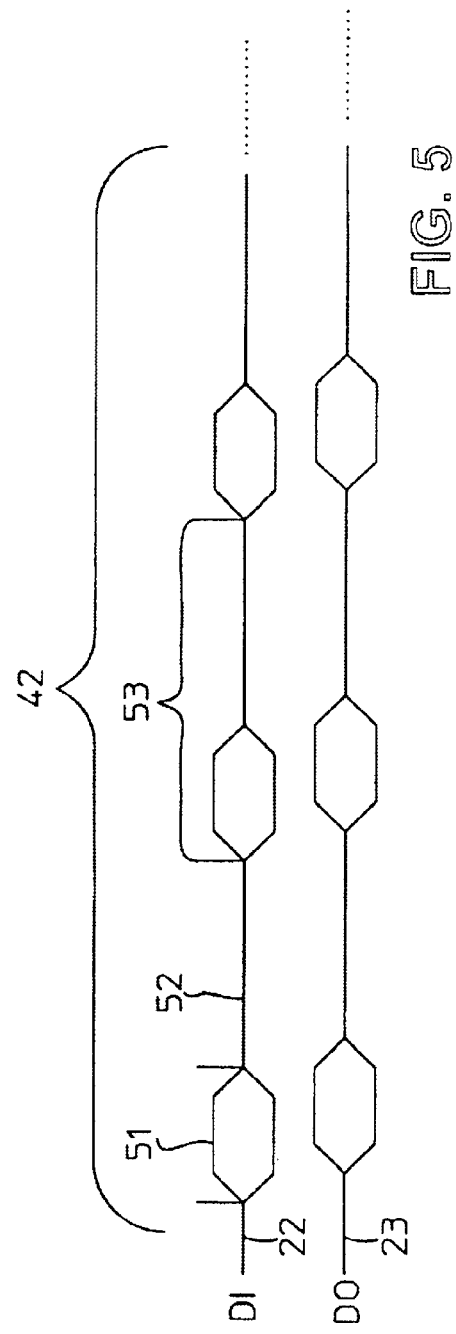

METHOD FOR CENTRALLY SETTING DATA RATE IN A DATA TRANSMISSION FACILITY AND A DEVICE FOR CENTRALLY SETTING DATA RATES

BACKGROUND OF THE INVENTION

1. Field of the Invention

The present invention relates to a method for centrally setting data rate in a data transmission facility and to an associated device for centrally setting data rates in the data transmission facility.

2. Description of the Prior Art

In a known data transmission facility described in DE 299 08 608 U1, the data rate for transmission of data is set using special telegrams. In this case, all receivers are preset to a data rate in the data rate setting step and are thus ready to receive and evaluate special telegrams. The data rate for future data transmission is set with reference to the special telegram for the data rate setting. The content of the special telegram includes information regarding the data rate. This is always transmitted with a single, preset data rate for the purpose of setting the data rate. However, the setting of the data rate according to this described method has the critical disadvantage that for central data rate setting the central station must send out special telegrams. This data transmission facility does not permit compatibility with subscribers that have no data rate setting, since transmission is only assured if all subscribers are capable of evaluating the special telegram.

From DE 44 18 622 C2, a method is known for determining the transmission rate in a bus system, according to which the transmission rate corresponding to the bit length is selected from a table by bit length measurement. In this described method, a counter is started when bit edge detection is begun, and stopped again after the following bit edge. The counter value determined thereby represents a bit length that corresponds to a data rate. The counter value is compared with a standard table of reference bit lengths. If the measured bit length matches a value in the table, the data rate is set accordingly. The method presented here is highly unreliable for data transmission facilities because signal edges in data circuits may be created by, for example, electromagnetic interference. As a consequence, reliable data rate setting in an industrial environment where electromagnetic disturbances abound is not possible with this measurement method. Since the counter for bit length measurement returns a value that corresponds to a data rate even with predetermined deviations, the realization thereof involves a great deal of effort and must be clocked at a higher system speed. Otherwise, the measurement will become very inaccurate at higher data rates because of the system-conditioned sampling error.

In INTERBUS basics and practice, ISBN 3-7785-2471, 1998, a serial data transmission protocol according to the INTERBUS transmission method is described. Synchronization of the telegrams and the function of the status telegrams are described here. This description always assumes a fixed data rate, which must be preset on all subscribers. In the data transmission method described here, no provision is made to enable the data rate to be set or changed centrally for all subscribers.

SUMMARY OF THE INVENTION

The object of the present invention is to provide a data transmission facility that allows a data rate determined by the central station to be set at the subscribers. To keep the data rate setting phase as brief as possible for the entire data transmission facility, it is necessary to provide an early forwarding system for the data rate setting telegrams from one subscriber to the next subscriber in the direction of the data flow. In existing data transmission facilities, in which the data rate cannot be set centrally, subscribers must be capable of being coupled and operated with a variable data rate. The subscribers being capable of setting themselves automatically to the fixed data rate.

In the method according to the present invention, the data rate is set at the coupled subscribers in a transmission facility before the beginning of transmission, starting from a central station. The transmission facility consists of a central station, which transmits output data to the subscribers connected to the bus, and in the other direction receives input data from the subscribers. Besides an interface to the peripheral application, the subscribers contain a protocol core and devices for data rate determination and data rate setting. In the method according to the present invention, data rate detection is solved with a means for telegram detection, such that one data rate detector is provided to detect each data rate. The means for telegram detection is provided in each data rate detector, and telegram detection is triggered not by a certain bit sequence, but by a significant pattern. This pattern may represent multiple telegram types. In the present method, telegrams are regenerated to stabilize the bit length during data rate setting in each of the data rate detectors. For example, in a data transmission facility according to the INTERBUS protocol, status telegrams are identified on the basis of significant bits in the telegram and the pause lasting several bit lengths between two status telegrams. In the method according to the present invention, the data rate may be reliably determined after a single status telegram and the associated pause have been detected. The particular advantage of the present invention consists in that an existing protocol, such as that of the INTERBUS, does not need to be changed. The current telegram patterns and timed sequences at the start of the data transmission can also be used for setting the data rate. In this event, it is possible to use those status telegrams that have already been used to cancel the reset, as described in INTERBUS basics and practice, ISBN 3-7785-2471, 1998, in the setting of the data rate. It is not necessary to change the protocol or to define a new data rate telegram.

The present invention will be described in the following with reference to an exemplary embodiment and the associated figures.

BRIEF DESCRIPTION OF THE DRAWING

FIG. 3: shows the timed phases at the beginning of data transmission;

FIG. 4: is a schematic representation in the timing diagram of the signal sequences on the data circuits in the individual timed phases;

FIG. 5: is a schematic representation in the timing diagram of the signal sequences on the data circuits for the data rate setting phase.

LIST OF REFERENCE NUMERALS UTILIZED IN THE DRAWING

Figure 1:
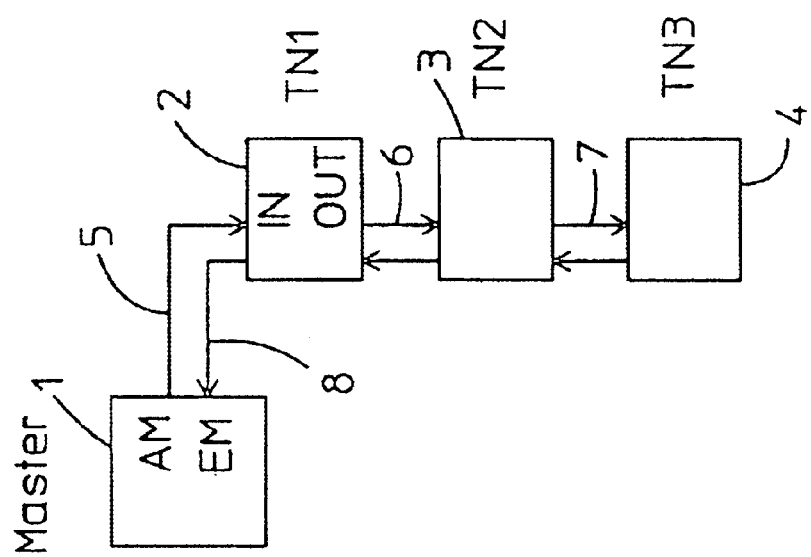
FIG. 1: shows an exemplary arrangement of the central station and the subscribers connected to the bus in the application according to the present invention.

1: Central station, Bus master
2: Subscriber 1, Bus module 1
3: Subscriber 2, Bus module 2
4: Subscriber 3, Bus module 3
5: Bus circuit, Outward data path segment 1
6: Bus circuit, Outward data path segment 2
7: Bus circuit, Outward data path segment 3
8: Bus circuit, Return data path
20: Reset signal for the protocol core
21: Data output of the protocol core
22: Data input
23: Data output
24: Decoder of the programmable data rate
25: Data rate validity signal BD1
26: Data rate validity signal BD2
27: Data rate validity signal BD3
28: Internal data circuit
29: Application data
30: Data rate detection
31: Protocol core
32: Data rate detector for data rate BD1
33: Data rate detector for data rate BD2
34: Data rate detector for data rate BD3
35: Data rate controller
36: Data circuit input selection switch
37: Data circuit output change-over switch
38: Application interface
39: Visual display signal of the set data rate
41: Phase reset
42: Data rate setting phase
43: Switch to protocol core phase
44: Activate protocol core phase
45: Bus operation, data transmission phase
51: Significant bit sequence
52: Significant pause
53: Data rate setting telegram

DETAILED DESCRIPTION OF THE PREFERRED EMBODIMENT

FIG. 1 shows an exemplary arrangement of a data transmission facility with a central station 1 and several subscribers 2, 3, 4 disposed one after the other with a data connection assured by bus circuits 5, 6, 7, 8.

Figure 2:
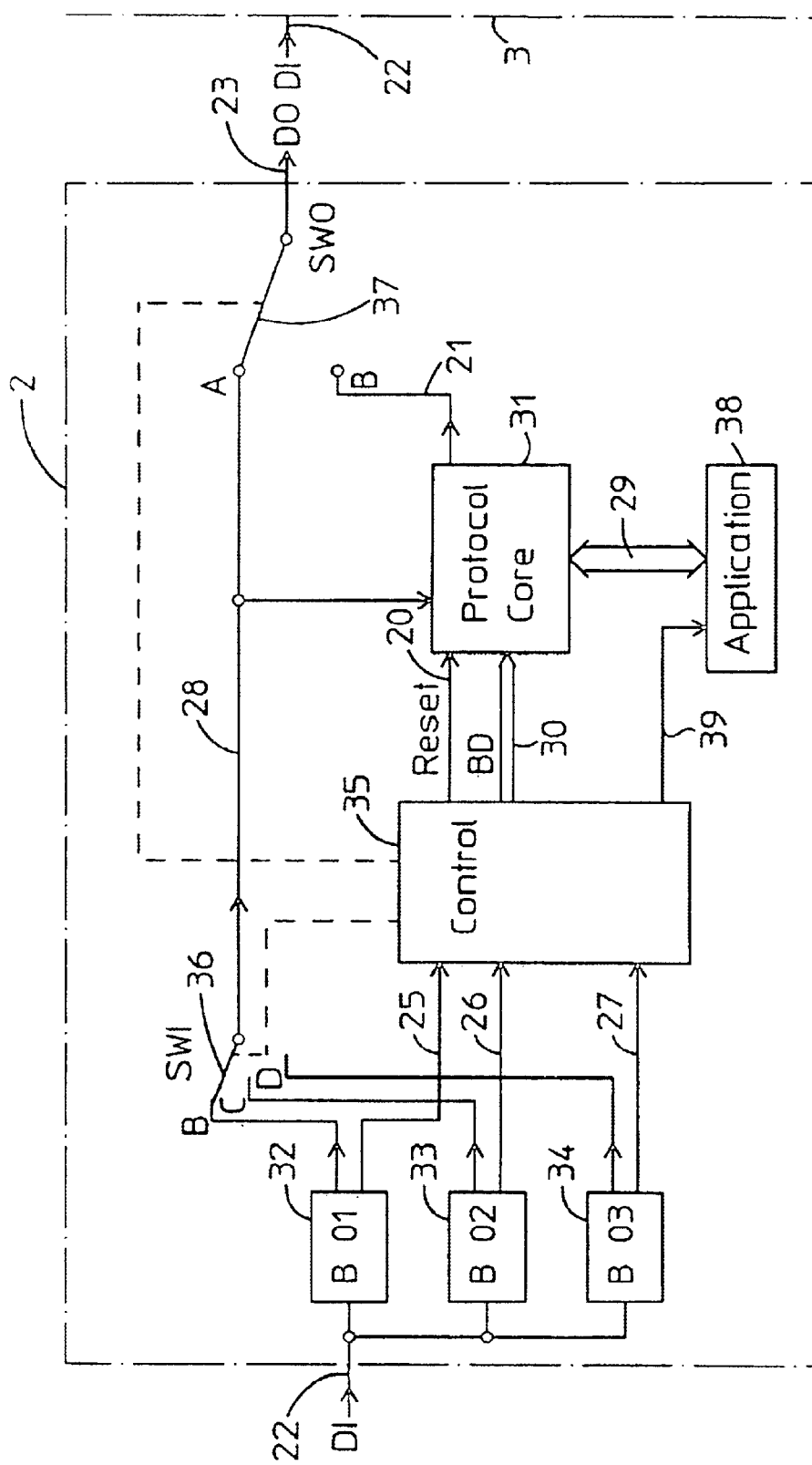
FIG. 2: is a schematic representation of the device with the individual blocks in a subscriber that are necessary for operating the bus and setting the data rate according to the present invention.

FIG. 2 shows essential functional devices within the subscriber 2, which are required in order to detect a data rate of data rate setting telegrams received at a data input 22, and to set the data rate for a protocol core 31. For example, a data rate detector 32 for a data rate BD1 is provided to detect the data rate of 500 Kbit/s, a data rate detector 33 for a data rate BD2 for 2 Mbit/s, and a data rate detector 34 for a data rate BD3 for 8 Mbit/s. During data rate setting, all of the data rate detectors 32, 33, 34 are active simultaneously and receive telegrams via the data input 22. When a valid telegram has been detected, a signal validating data rate BD1 25, or BD2 26, or BD3 27 is activated. As a rule, only one data rate detector may detect a single valid data rate, so that consequently only one data rate validity signal may be actively present at a data rate controller 35. As soon as the data rate controller 35 has detected the active signal validating data rate 25, 26 or 27, the data rate controller 35 switches a data circuit input-output selection switch 36 to a position B, C or D, to select the data rate detector having the detected data rate. In this way, a bypass-type connection is established through the subscriber 2 by way of an internal data circuit 28 and a data circuit output change-over switch 37 in position A, so that downstream the slave module 3 can also start data rate setting, and so on. In order to set a stable data rate, the data rate controller 35 does not fix the data rate BD until a specified number of telegrams have been detected or a specified time period has elapsed. In the data rate setting phase, the data rate controller 35 activates a reset signal 20 to the protocol core 31. When the valid data rate has been detected and a data rate detection 30 has been transferred to the protocol core 31, the reset signal 20 is deactivated and data rate output change-over switch 37 is switched to a protocol core data output 21. Then the protocol core 31 begins a protocol evaluation and is ready for data transmission. An application interface 38 establishes a link between an external application and the protocol core 31. This is also where information 29 regarding a set data rate 39 is made available to the application interface 38.

FIG. 3 is an embodiment of the method according to the present invention on the example of the INTERBUS, showing the timed phases for setting the data rate. In a first reset phase 41, all components are reset to an initial state in response to a protocol-specific pause. In a data rate setting timed phase 42, telegrams are sent out from the central station 1. The telegrams contain a predetermined number of bits, of which only significant bits are evaluated for purposes of data rate detection.

When the data rate setting timed phase 42 has elapsed, a switch to protocol core phase 43 follows, in which the internal data circuit 28 is then switched out of a bypass-type routing and back to the protocol core 31. The protocol core 31 activates at a later point in time 44. After this, data transmission can begin in accordance with a protocol provided. This is a data transmission phase 45.

FIG. 4 shows in chronological representation an example of telegram activity at the data input 22 of the reset signal 20 for the protocol core 31 and the functional switching position of the data circuit output change-over switch 37 during individually described timed phases. Telegram activity also takes place on the bus circuits 6, 7, 8.

FIG. 5 shows the telegrams as they may be used to set the data rate in a slave module. In the data rate setting timed phase, the central station 1 repeatedly sends data rate setting telegrams 53 to all subscribers over the bus circuit 5. A data rate setting telegram consists of a significant bit sequence 51 followed by a specific bit pause 52. Since this sequence of data rate setting telegrams is repeated several times in a same manner, only the data rate detector provided for the corresponding data rate can detect that data rate.

The other data rate detectors are also active, but since the received data rate setting telegram does not match the timed bit pattern they are expecting, they do not detect a data rate.

Figure 6:
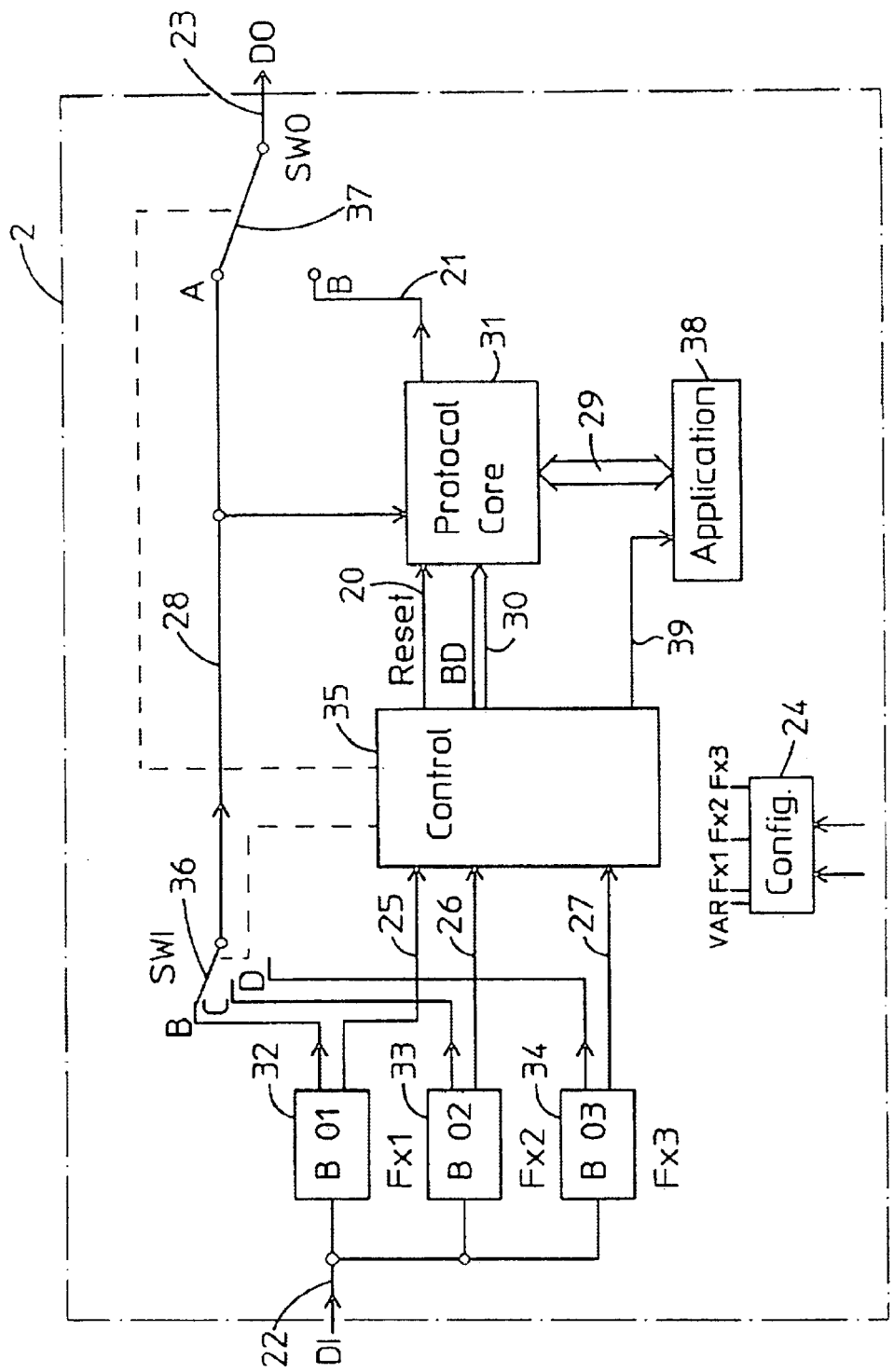
FIG. 6: is a schematic representation of a variant of a device with the individual blocks in a subscriber that are necessary for operating the bus and setting the data rate according to the present invention, wherein the data rate can be firmly preset.

FIG. 6 shows essential functional devices within the subscriber 2 in an embodiment that allows the data rate to be firmly preset in the subscriber 2. A decoder 24 for a firmly settable data rate selects only one data rate detector from the three data rate detectors 32, 33, 34 possible. When the selected data rate, BD1, BD2 or BD3 has been detected, the respectively selected data rate detector transfers the subsequently received data rate setting telegrams through the internal data circuit 28 and sets the data circuit output change-over switch 37 to a data output 23. The data rate controller 35, the protocol core 31, and the application interface 38 function in a same way, as was explained in the description of FIG. 2. At the same time, the data rate setting must be controlled in such manner by the central station 1 that, starting with the first data rate, the data rate setting timed phase 42 is repeated until the data rate setting telegrams sent over a bus circuit data return path 8 (FIG. 1) are received and detected. Then the central processor repeats the reset phase 41 and the data rate setting timed phase 42, but this time with the previously detected data rate.

In this way, the data rate for the entire data transmission facility can be set at a single subscriber.

What is claimed is:

1. A system for centrally setting a data rate in a data transmission facility, comprising:

a) a central station; and b) subscribers;

wherein said central station is disposed in series with said subscribers by a bus circuit;

wherein said subscribers are disposed in series with each other by bus circuits;

wherein each subscriber has a protocol core;

wherein each subscriber has data rate detectors;

wherein each subscriber has a data rate controller;

wherein said central station outputs data rate setting telegrams of a data rate to be set in said subscribers;

wherein a first subscriber inputs said data rate of said data rate setting telegrams outputted from said central station;

wherein each data rate detector of a respective subscriber detects a data rate different than that of the other data rate detectors thereof to allow only one data rate detector to detect only one valid data rate and in response thereto generate only one data rate validity signal; and wherein said data rate detectors of said respective subscriber simultaneously receive and evaluate said data rate inputted until such time as said one valid data rate has been detected by said one data rate detector thereof forming a detected data rate and in response thereto said one data rate detector thereof sends said one data rate validating signal thereof to said data rate controller thereof and in response thereto said data rate controller thereof selects said one data rate detector thereof having said detected data rate to form a bypass-type connection through said respective subscriber to output said detected data rate from said respective subscriber to be inputted by a next subscriber in series therewith to be used thereby to start data rate setting therein and so on until all of said subscribers in series with each other have data rates set therein.

2. The system as defined in claim 1, wherein each subscriber has a data output;

wherein each subscriber has a data input;

wherein each subscriber has a data circuit input-output selection switch;

wherein each subscriber has an internal data circuit;

wherein each subscriber has a data circuit output change-over switch;

wherein said data input of said respective subscriber inputs said data rate setting;

wherein said internal data circuit of said respective subscriber activates said data circuit output change-over switch thereof to form said bypass-type connection through said respective subscriber; and wherein said data output of said respective subscriber outputs said detected data rate from said respective subscriber to be inputted by said data input of said next subscriber in series therewith.

3. The system as defined in claim 2, wherein each subscriber has a reset signal;

wherein each subscriber has an application interface; and wherein said data rate controller activates said reset signal to said protocol core until said valid data rate has been detected and data rate detection has been transferred to said protocol core and in response thereto said data rate output change-over switch is switched to a protocol core data output and in response thereto said protocol core begins a protocol evaluation and transmits said valid data rate to an external application by way of said application interface establishing a link between said external application and said protocol core.

4. The system as defined in claim 2, wherein one of said subscribers has said data rate firmly fixed by preselection of said data rate detector to allow in a data rate setting phase only said data rate setting telegrams having a firmly set data rate to be forwarded via said data output to said next subscriber.

5. The system as defined in claim 1, wherein said data rate controller in order to set a stable data rate does not fix said data rate until one of a specified number of said data rate setting telegrams have been detected and a specified time period has elapsed.

6. The system as defined in claim 1, wherein said data rate is set in said protocol core when an expected significant bit pattern is detected from a plurality of possible data rates.

7. The system as defined in claim 1, wherein said protocol core is deactivated in a data rate setting phase.

8. The system as defined in claim 1, 2, 5, 3, 6, 7, or 4, wherein said data rate setting telegrams have respectively a same content for each data rate.

9. The system as defined in claim 8, wherein a small number of bits having a known state are used in order to detect said data rate from said data rate setting telegrams.

10. The system as defined in claim 9, wherein a bit sequence of said data rate setting telegrams is used for another function in the data transmission facility.

11. The system as defined in claim 9, wherein said data rate is firmly set at one subscriber and said central station and all other subscribers are set to this data rate.

12. The system as defined in claim 8, wherein a bit sequence of said data rate setting telegrams is used for another function in the data transmission facility.

13. The system as defined in claim 12, wherein said data rate is firmly set at one subscriber and said central station and all other subscribers are set to this data rate.

14. The system as defined in claim 8, wherein said data rate is firmly set at one subscriber and said central station and all other subscribers are set to this data rate.

15. A method for centrally setting a data rate in a data transmission facility, comprising the steps of:

a) providing a central station and subscribers;

b) disposing the central station in series with the subscribers by a bus circuit;

c) disposing the subscribers in series with each other by bus circuits;

d) providing each subscriber with a protocol core, data rate detectors, and a data rate controller;

e) outputting by the central station data rate setting telegrams of a data rate to be set in the subscribers;

f) inputting by a first subscriber the data rate of the data rate setting telegrams outputted from the central station;

g) detecting by each data rate detector of a respective subscriber a data rate different than that of the other data rate detectors thereof to allow only one data rate detector to detect only one valid data rate and in response thereto generate only one data rate validity signal; and h) receiving and evaluating by the data rate detectors of the respective subscriber simultaneously the data rate inputted until such time as the one valid data rate has been detected by the one data rate detector thereof forming a detected data rate and in response thereto the one data rate detector thereof sends the one data rate validating signal thereof to the data rate controller thereof and in response thereto the data rate controller thereof selects the one data rate detector thereof having the detected data rate to form a bypass-type connection through the respective subscriber to output the detected data rate from the respective subscriber to be inputted by a next subscriber in series therewith to be used thereby to start data rate setting therein and so on until all of the subscribers in series with each other have data rates set therein.

16. The method as defined in claim 15; further comprising the step of providing each subscriber with a data output, a data input, a data circuit input-output selection switch, an internal data circuit, and a data circuit output change-over switch; wherein said receiving and evaluating step includes:

a) inputting by the data input of the respective subscriber the data rate setting;

b) activating by the internal data circuit of the respective subscriber the data circuit output change-over switch thereof to form the bypass-type connection through the respective subscriber; and c) outputting by the data output of the respective subscriber the detected data rate from the respective subscriber to be inputted by the data input of the next subscriber in series therewith.

17. The method as defined in claim 16; further comprising the step of providing each subscriber with a reset signal and an application interface;

wherein said receiving and evaluating step includes activating by the data rate controller the reset signal to the protocol core until the valid data rate has been detected and data rate detection has been transferred to the protocol core and in response thereto the data rate output change-over switch is switched to a protocol core data output and in response thereto the protocol core begins a protocol evaluation and transmits the valid data rate to an external application by way of the application interface establishing a link between the external application and the protocol core.

18. The method as defined in claim 16, wherein said receiving and evaluating step includes firmly fixing the data rate of one of the subscribers by preselection of the data rate detector to allow in a data rate setting phase only the data rate setting telegrams having a firmly set data rate to be forwarded via the data output to the next subscriber.

19. The method as defined in claim 15, herein said receiving and evaluating step includes not fixing by the data rate controller the data rate until one of a specified number of the data rate setting telegrams have been detected and a specified time period has elapsed in order to set a stable data rate.

20. The method as defined in claim 15, wherein said receiving and evaluating step includes setting the data rate in the protocol core when an expected significant bit pattern is detected from a plurality of possible data rates.

21. The method as defined in claim 15, wherein said receiving and evaluating step includes deactivating the protocol core in a data rate setting phase.

22. The method as defined in claim 15, 16, 19, 17, 20, 21, or 18, wherein said outputting step includes providing the data rate setting telegrams with respectively a same content for each data rate.

23. The method as defined in claim 22, wherein said receiving and evaluating step includes using a small number of bits having a known state in order to detect the data rate from the data rate setting telegrams.

24. The method as defined in claim 23, wherein said receiving and evaluating step includes using a bit sequence of the data rate setting telegrams for another function in the data transmission facility.

25. The method as defined in claim 23, wherein said receiving and evaluating step includes firmly setting the data rate at one subscriber and the central station and all other subscribers are set to this data rate.

26. The method as defined in claim 22, wherein said receiving and evaluating step includes using a bit sequence of the data rate setting telegrams for another function in the data transmission facility.

27. The method as defined in claim 26, wherein said receiving and evaluating step includes firmly setting the data rate at one subscriber and the central station and all other subscribers are set to this data rate.

28. The method as defined in claim 22, wherein said receiving and evaluating step includes firmly setting the data rate at one subscriber and the central station and all other subscribers are set to this data rate.

* * * * *